United States Patent [19]
Reinartz et al.

[11] Patent Number: 5,195,419
[45] Date of Patent: Mar. 23, 1993

[54] METHOD FOR ASSEMBLING A PISTON-AND-CYLINDER UNIT AND FORCE TRANSMISSION ELEMENT

[75] Inventors: Hans D. Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 659,370
[22] PCT Filed: May 21, 1990
[86] PCT No.: PCT/EP90/00816
§ 371 Date: Mar. 19, 1991
§ 102(e) Date: Mar. 19, 1991
[87] PCT Pub. No.: WO91/01462
PCT Pub. Date: Feb. 7, 1991

[30] Foreign Application Priority Data
Jul. 19, 1989 [DE] Fed. Rep. of Germany ....... 3923842

[51] Int. Cl.$^5$ .............................................. F16R 15/24
[52] U.S. Cl. ...................... 92/13.3; 92/13.41; 60/584
[58] Field of Search ................ 60/533, 534, 547.1, 60/562, 581, 584, 591; 92/13.3, 13.4, 13.41, 13.7

[56] References Cited
U.S. PATENT DOCUMENTS
4,307,570 12/1981 Yardley ............................. 92/13.41
4,709,551 12/1987 Saalbach et al. ................. 92/13.7
5,014,514 5/1991 Reinartz et al. ................. 92/13.41

FOREIGN PATENT DOCUMENTS
0075505 9/1982 European Pat. Off. .
3446005 6/1986 Fed. Rep. of Germany .

Primary Examiner—Edward K. Look
Assistant Examiner—F. Daniel Lopez
Attorney, Agent, or Firm—Robert P. Seitter; J. Gordon Lewis

[57] ABSTRACT

There is presented a method for assembling a tandem master cylinder and a vacuum brake power booster of a hydraulic brake system for automotive vehicles. Air is injected via the pressure connections (19, 36) of the pressure chambers (11, 18) associated with the pistons (2, 3). Simultaneously, the pistons (2, 3) are moved in the direction away from the brake pedal. The pressure increase in the pressure chamber (18) is measured during the movement of the pistons (2, 3) and thus during the movement of the central valve (14) accommodated in the floating piston (3). The air pressure in chamber (18) will rise as soon as the closing member (15) of the central valve (14) has moved to sit on the valve seat (16) and the central valve is closed thereby. A trigger point which determines a measured distance on the abscissa of the diagram is fixed in the curve of the diagram "Pressures as a function of the travel of the central valve", the said curve indicating the pressure increase. This measured distance dictates the number and/or dimensioning of spacing washers (8) which are to be arranged between the pressure element (9) and the push rod piston (2) in order to accomplish a reduction of the lost travel of the central valve (14). The present invention serves to accomplish an elegant method in conformity with the demands of automation for assembling a tandem master cylinder and a vacuum brake power booster, as well as a simultaneous reduction of the lost travel of the second central valve (14).

14 Claims, 2 Drawing Sheets

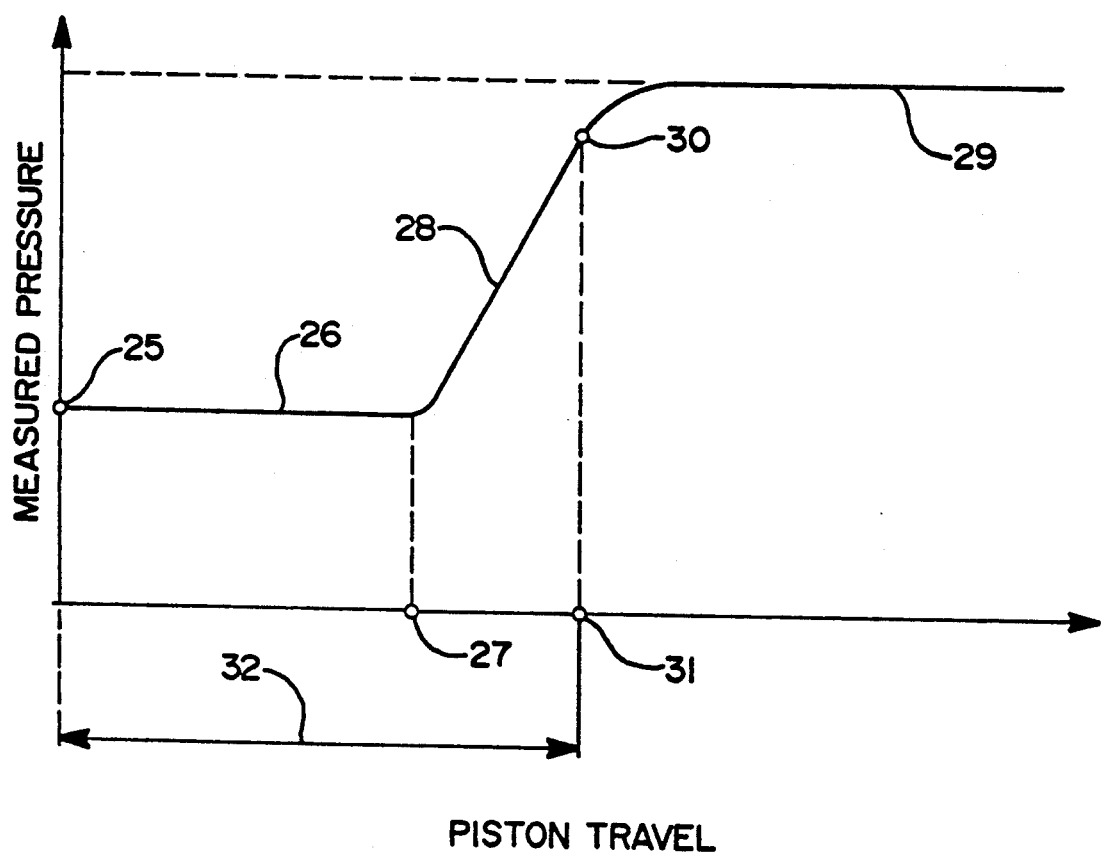

METHOD FOR ASSEMBLING A PISTON-AND-CYLINDER UNIT AND FORCE TRANSMISSION ELEMENT

BACKGROUND OF THE INVENTION

The present invention relates to a method for assembling a piston-and-cylinder unit and a force transmission element, for instance a pressure element, with the unit comprising a first piston (push rod piston) as well as a second piston (floating piston) connected downstream of the first piston in the actuating direction, as well as comprising each one central valve allocated to the first and second pistons, respectively, which separates the pressure chamber assigned to the push rod piston and to the floating piston from an unpressurized brake fluid supply reservoir and/or connects it to the brake fluid supply reservoir in dependence on the piston's movement. Such central valves are described for instance in German published patent application (DE-OS) 36 29 564. This application discloses a brake system with slip control essentially consisting of a pedal-operated, preferably auxiliary-energy-assisted braking pressure generator which the wheel brakes are connected to via pressure lines, of a hydraulic auxiliary-pressure supply system with a hydraulic pump, with a pressure-compensating and pressure fluid supply reservoir and with an auxillary-pressure control valve as well as wheel sensors and electronic circuits for determining the rotational behavior of the wheels and for generating electric braking pressure control signals by means of which electromagnetically operable pressure fluid inlet valves and outlet valves are controllable which are inserted into the pressure fluid lines for the purpose of slip control.

The subject matter of the cited published patent application is characterized by a switch inserted into the pressure line of the auxiliary energy source, said switch operating upon the attainment of a predetermined hydraulic pressure and thus emitting an electric signal to the signal processing and combining circuit which latter causes the pump's motor to switch on and off for a checking cycle and which thus can signalize the driver of the vehicle and motor-and-pump unit's readiness for operation via a visual or acoustic display.

When combining master cylinders and vacuum brake power boosters as described in the cited published patent application as well as, generally, when assembling a piston-and-cylinder unit and a force transmission element, with one valve each being arranged in serially arranged pistons of the unit, there will result the disadvantages described in the following and explained with reference to the central valves of the subject matter of the above-mentioned published patent application.

The closing travel of the central valves of the two pressure circuits and the lost travel associated therewith becomes too large by assembly. Said excessive lost travel results from the adding-up of many tolerances of the individual components of the tandem master cylinder. When multiplying this closing travel with the pedal transmission, shortcomings are encountered when the pedal is operated.

According to the prior art, the tandem master cylinder is assembled, except for the spacing washers and the pressure element. Then, the gauge is ascertained which serves as a distance between the surface of the flange of the master cylinder, on the one hand, and the bore depth of the pressure element, on the other hand, said flange serving to connect the vacuum brake booster. The number of spacing washers are determined in a further step. The spacing washers and the pressure element with retaining ring will be assembled subsequently.

In this way, in prior art it is admittedly achieved that the tandem master cylinder and the vacuum booster are assembled free from play. On the other hand, however, all the tolerances of the individual components fully add to the central valve closing travel in a very disadvantageous manner. The lost travel of the central valves becomes correspondingly large. As illustrated above, it disadvantageously multiples with the pedal transmission.

BRIEF DESCRIPTION OF THE INVENTION

This invention is based on the following objects:

The described disadvantages of the state of the art are to be avoided. The central valves' closing travel is to be shortened. It is to be avoided that the tolerances of the individual components add up and be reckoned with the central valves' closing travel.

The cost incurred for assembly of the cylinder is to be reduced. The adjustment of the closing travel of the central valve is to be performed within the scope of the overall cylinder adjustment.

It is to be made possible to use components with greater tolerances. This is to lead to a reduction in the final product price.

According to the present invention, the objects set forth are solved by a special method for assembling the piston-and-cylinder unit and the force transmission element. According to this method, it is provided that to reduce the lost travel of the central valve which is arranged in particular in the floating piston, preferably the travel of the closing member and/or the valve seat of the central valve, the central valve, in particular in its capacity as an integral component part of the floating piston, is moved with the latter in the direction of pressure increase, that simultaneously the pressure chambers associated with the two pistons are acted upon by a measurement medium, in particular air, while the central valve allocated to the push rod piston remains open, with the pressure being measured which prevails in the pressure chamber allocated to the floating piston and experiences a marked increase due to the closing action of the central valve, that the travel of the central valve from its initial position up to the marked increase (measured distance) is used as an information for the dimensioning of one or a plurality of spacers, in particular spacing washers, to be arranged between the force transmission element, in particular the pressure element, and the push rod piston.

A particularly elegant method in conformity with the demands of automation consists in that pressure medium, in particular compressed air, is injected into both pressure chambers, which air at first passes through the central valves and enters the channels leading to the brake fluid supply reservoir, in that both pistons are moved in the direction away from the brake pedal, in that during the movement of the pistons the air pressure is measured in the second pressure chamber, in that the measured distance of the floating piston is determined which is defined by the marked increase in the air pressure occurring during the closing action of the central valve, in that the measured distance is used as an information for the dimensioning of one or of a plurality of spacers, in particular spacing washers, which are to be arranged between the force transmission element and the piston.

An alternative embodiment of the previously described method resides in applying the same pressure to both pressure chambers.

It is proposed furthermore that differently high pressures are applied to the two pressure chambers.

It can be provided in the method just described hereinabove that a trigger point for measuring purposes is determined which is disposed in the last portion of the line, in particular of the straight line, of a pressure-travel diagram and which limits the measured distance, the said line describing the marked increase in pressure as a function of the central valve's travel.

A master-cylinder and brake-power-booster unit with a pressure element transmitting the force of the brake power booster onto the push rod piston of the master cylinder, said unit being assembled according to the described method, can be of such design that one or a plurality of spacers, in particular spacing washers, are arranged between the push rod piston of the master cylinder and the pressure element, which spacer(s) was/were dimensioned on the basis of at least one measured distance.

For implementing the described method, a device is suggested wherein it is provided that there are arranged a measuring device for the travel of the floating piston and a measuring device for the pressure, in particular air pressure, prevailing in the second pressure chamber of the master cylinder, that an information-processing unit is arranged which determines the variation of the pressure as a function of the piston travel and the measured distance up to the marked pressure increase.

Further, there is suggested a device of such a design as to arrange for a measuring device for the travel of the floating piston and a measuring device for the second pressure prevailing in the pressure chamber of the master cylinder, there being provision of an information-processing unit which determines the variation of the pressure as a function of the piston travel, a trigger point in the variation of the pressure increase, in particular in the last portion of the pressure increase, and the measured distance of the piston up to the trigger point.

Further, a device can be provided which, due to the measured distance, determines and indicates the dimensioning and/or the number of the spacers, in particular the spacing washers.

BRIEF DESCRIPTION OF THE DRAWINGS

Further details of this invention are to be gathered from the following description of two examples of embodiment. These examples of embodiment will be explained with reference to two Figures.

FIG. 2, is an air pressure-travel diagram.

DETAILED DESCRIPTION OF THE INVENTION

Figure 1:
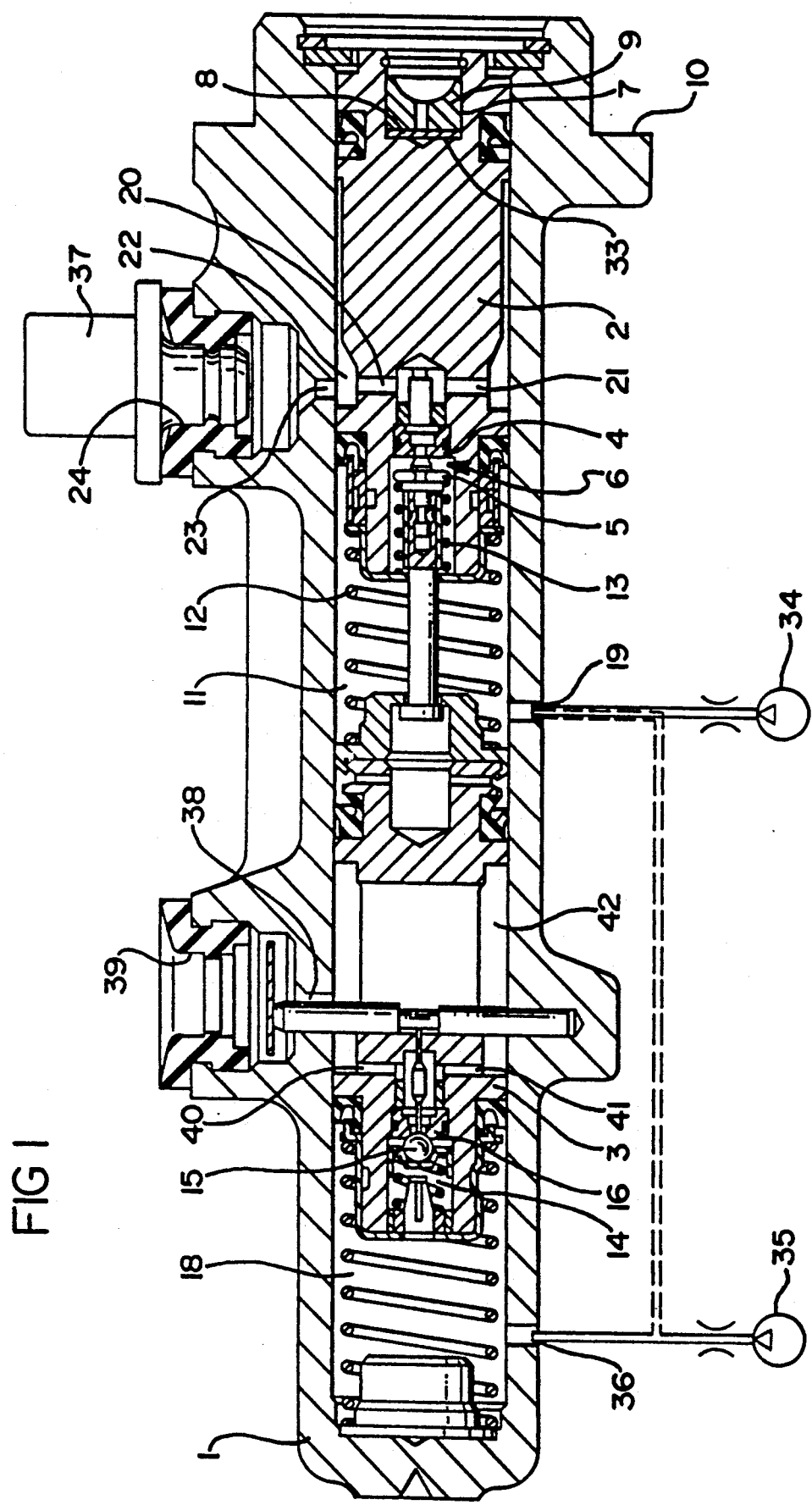
FIG. 1, is a master cylinder provided for assembly with a vacuum brake power booster.

The master cylinder shown in FIG. 1 consists of a housing 1 and two pistons accommodated in the housing, i.e. a push rod piston 2 and floating piston 3, which each contain in their inside one central valve 6, 14. The function of the central valve is described in the above-mentioned published patent application 37 31 603 and in the 8th edition 1984 of the Alfred Teves GmbH "Bremsen handbuch" (Brake Handbook), see inter alia page 74. The central valve 6 arranged in the push rod piston 2 includes a valve seat 4 and a valve closure member 5, while the central valve 14 arranged in the floating piston 3 has a valve seat 16 and a valve closing member 15 of preferably spherical design.

The push rod piston 2 is furnished with a blind-end bore 7 on the pedal side. Said blind-end bore has the bottom surface 33. The bore receives a spacer 8 and a pressure element 9. It is possible to mount a plurality of spacing washers instead of the spacer.

During assembly, the tandem master cylinder is connected with a non-illustrated vacuum brake power booster in the area of the flange surface 10, see the above-mentioned published patent applications in this respect.

According to the state of the art, the tandem master cylinder and the vacuum brake power booster are assembled as follows:

At first the gauge (reference gauge) is ascertained which exists between the flange surface 10 and the bottom 33 of the blind end bore (bore depth of the pressure element). Then in particular the axial extension of the spacer 8 or the number of the spacing washers is determined.

The spacer or rather the spacing washers serve to transmit the translatory force which is applied to the pressure element 9 by the vacuum brake power booster. The spacer or rather the spacing washers pass this force on to the push rod piston 2.

The reference gauge ascertained by means of the prior art method permits the assembly of the tandem master cylinder and the vacuum brake power booster free from play. The disadvantage of this method consists in that all tolerances of the individual components fully add up in the closing travel of the second central valve. At the pedal, the large lost travel of the second central valve multiplies with the pedal's transmission ratio what leads to disadvantages in the brake pedal's operation.

In the following, the inventive methods will be described where the gauge from the flange surface 10 up to the bottom 33 of the pressure element bore 7 is determined in the closed condition of the central valve 14, the processes being explained by way of the diagram shown in FIG. 2.

The abscissa carries the units of the travel of the second central valve, or rather of the floating piston, in which the second central valve is incorporated as an integral component part, while on the ordinate the units of an air pressure are indicated which prevails in the second pressure chamber 18 during measuring.

The tandem master cylinder is assembled except for the spacer 8, or rather the spacing washers, and except for the pressure element 9. The gauge between flange surface 10 and bottom 33 of the pressure element bore is determined with the aid of measuring a pneumatic pressure. In detail, the following will happen:

Both pressure chambers 11, 18 are acted upon by pneumatic pressure supplied by two compressed-air sources 34, 35. Pressure connections 19, 36 of the master brake cylinder for the two pressure chambers 11, 18 are used to this end. The compressed air injected into the first pressure chamber 11 which assists the effect of a spring 12 urging the two pistons 2, 3 apart escapes when the first central valve 6 is open between the latter's closing member and valve seat 4 to the outside via the radially arranged bores 20, 21, an annular chamber 22, a channel 23, via the connection 24 for the supply reservoir. However, it is also possible that the connection 24 is closed during measuring, e.g. by means of a suitable closing member 37. It is ensured by pressurization of the first pressure chamber 11 that a relative movement of the two pistons is reliably precluded to that the first central valve 6 remains open during measuring.

The compressed air injected into the second pressure chamber 18, the initial air pressure being traced in point 25 in the diagram as per FIG. 2, can at first escape to the outside through the open second central valve 14 via radial bores 40, 41, an annular chamber 42, a channel 38 and a connection 39 for the supply reservoir. The pressure of the air injected into the first pressure chamber 11 is preferably higher than the air pressure acting upon the second pressure chamber 18. Now both pistons 2, 3 are moved to the left in FIG. 1. At first, the air pressure in the second pressure chamber 18 remains approximately constant, see straight line 26 of FIG. 2. In point 27 on the abscissa, the movement of the floating piston 3 will have advanced so far that the closing action of the central valve 14 starts.

The opening cross-section for the air to pass through between valve member 15 and valve seat 16 of the second central valve 14 will be reduced. That means that the air pressure in the second pressure chamber 18 will rise. This is illustrated in the diagram by the ascending line which, as is evident from FIG. 2, is a straight line 28 over a larger area. Finally, the second central valve 14 is closed, and an increased pressure is prevailing in the pressure chamber 18. This is represented in the diagram by the straight line 29.

During the leftward movement of the floating piston 3, the pressure in the pressure chamber 18 is measured continuously. In the last portion of the straight line 28, a trigger point 30 is fixed for measuring purposes. It is by means of this trigger point that point 31 on the abscissa is determined. The distance between the zero point and point 31 on the abscissa is the measured distance 32. This measured distance, i.e. the travel of the second central valve 14, or rather the floating piston 3, up to the trigger point will be used as an information for dimensioning the spacer 8 or one or a plurality of spacing washers which, subsequently, are inserted between pressure element 9 and push rod piston 2 in abutment on the bottom 33.

It is, however, also possible without departing from the idea of this invention to apply compressed air under the same pressure to the two pressure chambers 11, 18, as is illustrated in dotted lines in FIG. 1. To ensure that no relative movement of the pistons 2, 3 is performed during measuring, the channel 23 leading to the reservoir connection 24 must be closed air-tightly during the measuring operation, preferably by closing the reservoir connection 24 by means of the above-mentioned closing member 37.

What is claimed is:

1. A method for assembling a piston-and-cylinder unit and a force transmission element, said unit comprising a push rod piston and a floating piston connected downstream of the push rod piston in an actuating direction, each piston including a central valve including a seat and closing member which separates pressure chambers associated with each of said piston from an unpressurized brake fluid supply reservoir and connects said chambers with the brake fluid supply reservoir in response to the pistons' movement, characterised in that to reduce lost travel of the central valve in the floating piston, the central valve is moved with the floating piston in a direction of pressure increase and, simultaneously the pressure chambers associated with the pistons are acted upon by a measurement medium while the central valve allocated to the push rod piston remains open, with the pressure being measured which prevails in the pressure chamber allocated to the floating piston and experiences a marked increase due to the closing action of the central valve, in that the travel of the central valve from an initial position up to the marked increase (measure distance) is used as an information for the dimensioning of spacers to be arranged between the force transmission element and the push rod piston.

2. A method as claimed in claim 1, characterised in that pressure medium is injected into both pressure chambers, which medium at first passes through the central valves and enters channels leading to the brake fluid supply reservoir, in that both pistons are moved in the direction away from the force transmission element, in that the medium pressure in the second pressure chamber is measured, in that the measured distance of the floating piston is determined which is defined by a marked increase in the pressure occurring during the closing action of the central valve, in that the measured distance is used as an information for the dimensioning of spacers which are arranged between the force transmission element and the push rod piston.

3. A method as claimed in claim 1, characterised in that the same pressure is applied to both pressure chambers.

4. A method as claimed in claim 3, characterised in that the channel allocated to the first pressure chamber and leading to the brake fluid supply reservoir is closed.

5. A method as claimed in claim 1, characterised in that differently high pressures are applied to the two pressure chambers.

6. A method as claimed in claim 5, characterised in that the channel allocated to the first pressure chamber and leading to the brake fluid supply reservoir is closed.

7. A piston-and-cylinder unit assembled according to the method as claimed in claim 1, characterised in that said spacer are arranged between the push rod piston of the master cylinder and the pressure element, which spacer was dimensioned on the basis of at least one measured distance.

8. A device for implementing a method as claimed in claim 1, characterised in that there are arranged a measuring device for the travel of the floating piston and a measuring device for the pressure prevailing in the second pressure chamber of the master cylinder, in that an information-processing unit is provided which determines the variation of the pressure as a function of the piston travel and the measured distance up to the marked pressure increase.

9. A device as claimed in claim 8, characterised in that there are arranged a measuring device for the travel of the floating piston and a measuring device for the pressure prevailing in the second pressure chamber of the master cylinder, in that an information-processing unit is provided which determines the variation of the pressure as a function of the piston travel, a trigger point in the variation of the pressure increase, in particular in the last portion of the pressure increase, and the measured distance up to the trigger point.

10. A device as claimed in claim 8, characterised in that a device is provided which, due to the measured distance, determines and indicates the dimensioning and number of the spacers.

11. A method as claimed in claim 1, characterised in that a trigger point for measuring purposes is determined which is disposed in the last portion of the line, in particular the straight line, of a pressure-travel diagram and which limits the measured distance, the said line describing the marked increase in pressure as a function of the central valve's travel.

12. A method of assembling a tandem master brake cylinder of the type including push rod and floating piston slidably disposed in a bore formed in a housing and co-acting therewith to define first and second substantially closed pressure chambers, each said chamber adapted for fluid communication with a brake circuit through a pressure connection and with a fluid supply reservoir through a valve carried by the piston associated therewith, said method comprising the steps of:

simultaneously injecting test fluid at known pressure into said chambers via said pressure connections;

mechanically displacing said push rod piston with a force transmission element to effect a pressure increase in said chambers and a resulting displacement of said floating piston;

measuring the fluid pressure in the floating piston pressure chamber to determine a characteristic pressure versus floating piston displacement operational characteristic for said cylinder;

selecting at least one spacer of known axial dimension as a function of a predetermined trigger point on said operational characteristic corresponding with closure of said floating piston valve; and axially juxtaposing said spacer between said push rod piston and force transmission element to minimize lost travel of said floating piston valve.

13. A method of assembling a master brake cylinder of the type including push rod and floating pistons slidably disposed in a housing bore to define associated pressure chambers, the push rod piston chamber adapted for fluid communication with a brake circuit and interconnection with a fluid supply reservoir through a valve carried by said floating piston, said method comprising the steps of:

simultaneously injecting test fluid into said chambers;

displacing said push rod piston with a force transmitting element to effect a pressure increase in said chambers and resulting displacement of said floating piston;

measuring the fluid pressure in the floating piston pressure chamber to determine a characteristic pressure-displacement operating characteristic for said cylinder; and selecting spacing means of known axial dimension as a function of a predetermined trigger point on said operational characteristic for juxtaposition between said push rod piston and force transmission element.

14. The method of claim 13, where said test fluid is air.

* * * * *